United States Patent
Cucheran et al.

[11] Patent Number: 5,769,292
[45] Date of Patent: Jun. 23, 1998

[54] ADJUSTABLE CLAMP FOR USE WITH A VEHICLE ARTICLE CARRIER

[75] Inventors: John S. Cucheran, Lake Orion; Jeffrey M. Aftanas, Sterling Heights; Jon D. Sparham, Waterford, all of Mich.

[73] Assignee: JAC Products, Inc., Ann Arbor, Mich.

[21] Appl. No.: 828,518

[22] Filed: Mar. 31, 1997

Related U.S. Application Data

[63] Continuation of Ser. No. 497,211, Jun. 30, 1995, abandoned.

[51] Int. Cl.⁶ .............................. B60R 9/10; B60R 9/048
[52] U.S. Cl. ...................... 224/324; 224/319; 224/321; 224/924; 24/569; 24/525
[58] Field of Search ..................................... 224/319, 325, 224/326, 324, 328, 329, 330, 331, 309, 924; 248/505, 316.4, 229.12, 229.22, 228.3, 237.41; 403/373, 233, 230, 256; 24/569, 525

[56] References Cited

U.S. PATENT DOCUMENTS

| | | | |
|---|---|---|---|
| 1,983,670 | 12/1934 | Knight | 248/228.3 |
| 2,455,141 | 11/1948 | Runge | 24/569 |
| 2,776,495 | 1/1957 | Dickey | 248/228.3 |
| 3,601,295 | 8/1971 | Lowe | 248/229.22 |
| 4,736,878 | 4/1988 | Rasor . | |
| 5,114,060 | 5/1992 | Boyer . | |
| 5,456,396 | 10/1995 | Allen | 224/319 |

FOREIGN PATENT DOCUMENTS

| | | | |
|---|---|---|---|
| 1004722 | 4/1952 | France | 224/319 |
| 30 08 984 A1 | 2/1980 | Germany . | |
| 8811874 U | 9/1988 | Germany . | |
| 9310790 U | 7/1993 | Germany . | |
| 320995 | 6/1935 | Italy | 24/525 |
| 1144004 | 3/1969 | United Kingdom . | |
| 1468823 | 3/1977 | United Kingdom . | |

*Primary Examiner*—Linda J. Sholl
*Attorney, Agent, or Firm*—Harness, Dickey & Pierce, PLC

[57] ABSTRACT

A clamp apparatus for securing an independent article securing implement to a support bar of an existing vehicle article carrier without requiring any disassembly of the support bar from the vehicle article carrier. The clamp apparatus includes a first body portion and a second body portion. The first body portion includes a channel portion and a hook portion and the second body portion includes a base portion slidably engageable within the channel portion, and a hook portion. The first and second body portions are clamped over a support bar through the use of an elongated threaded fastener and fastening nut, which provides a significant degree of adjustability to accommodate support bars having varying cross-sectional widths. A pair of elongated, slot-like openings are formed in the first body portion and a pair of openings are also formed in the second body portion. Threaded nuts are associated with the openings formed in the second body portion such that once the apparatus is secured to a support bar, a pair of conventional fastening elements associated with the article securing implement can be secured to the clamp apparatus quickly and easily. The apparatus thus forms a means by which a variety of article securing implements can be quickly and easily attached to and removed from a support bar of an existing vehicle article carrier without requiring disassembly or any component of the existing vehicle article carrier.

7 Claims, 2 Drawing Sheets

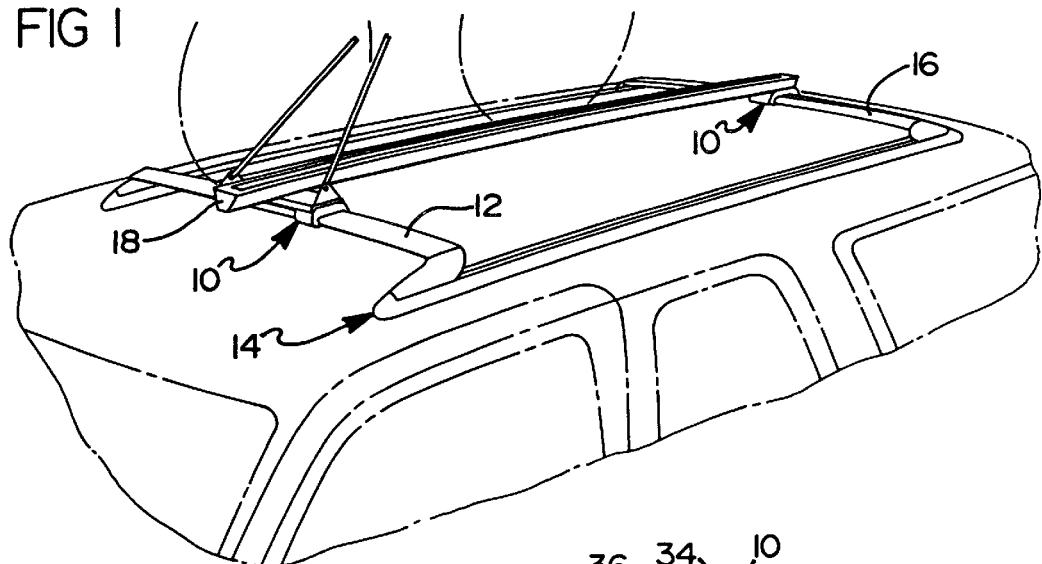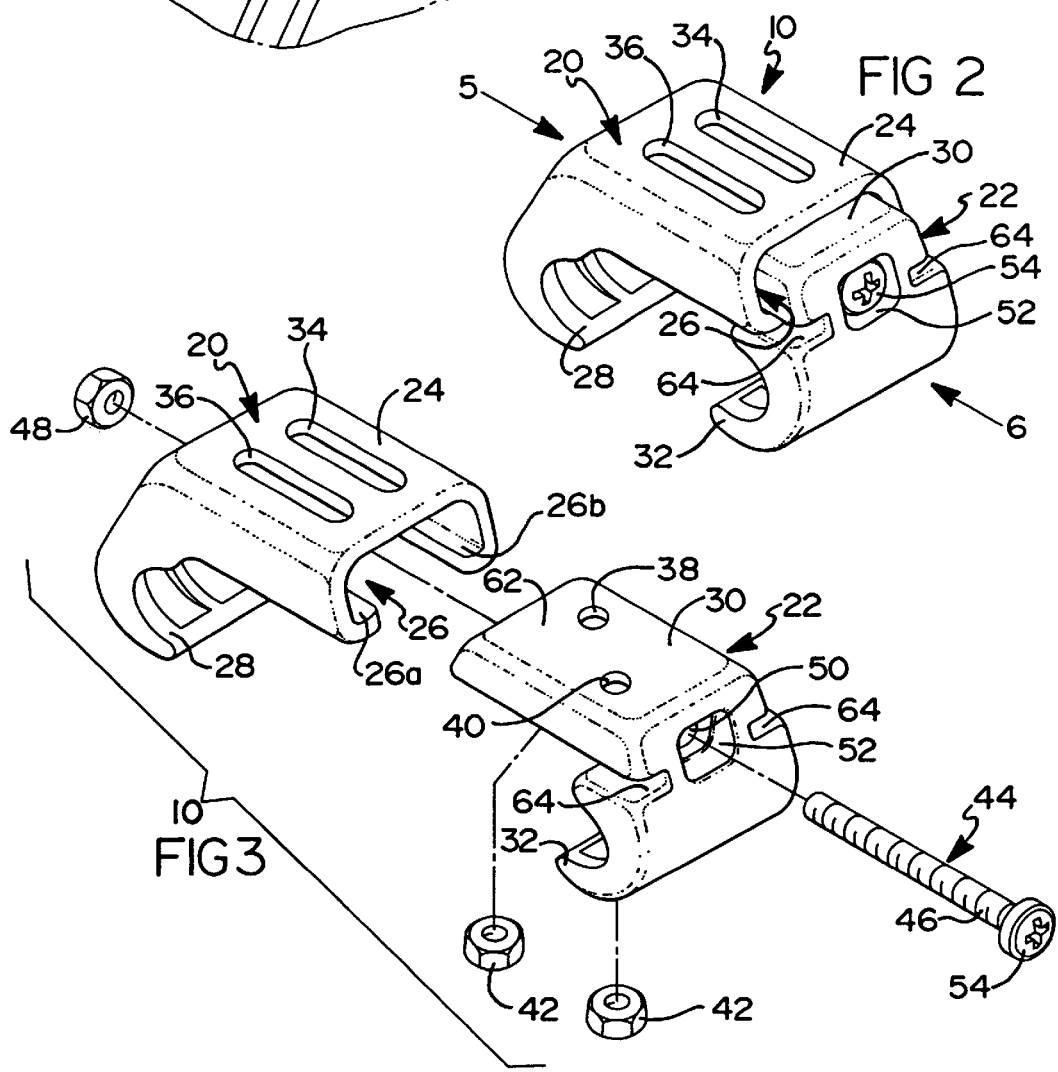

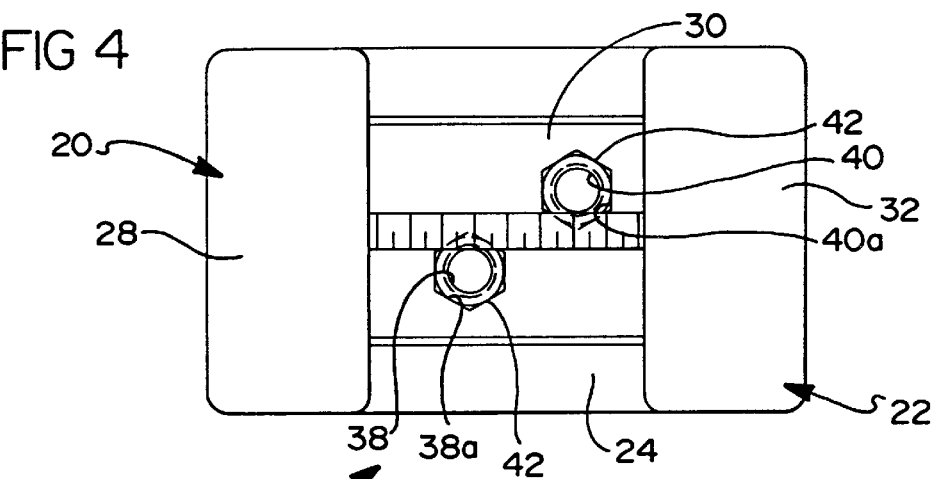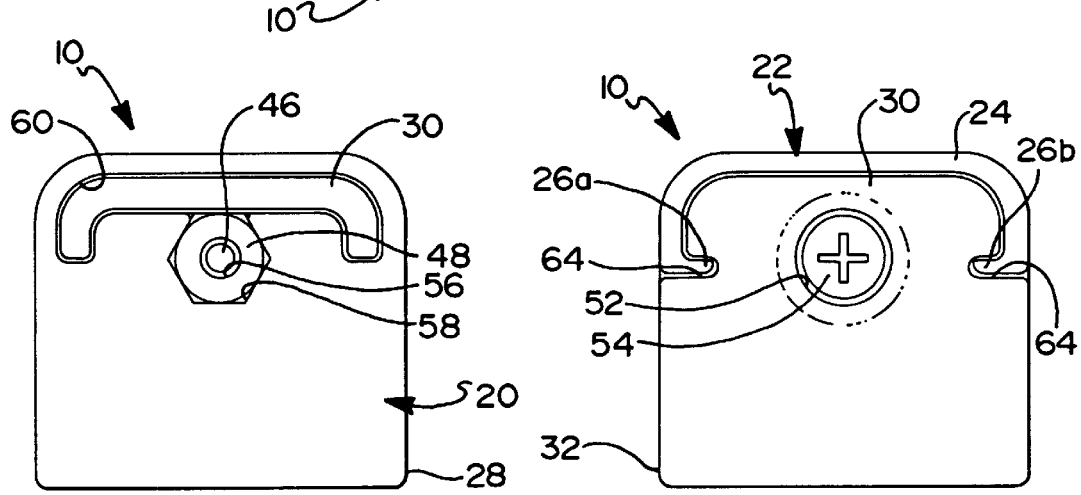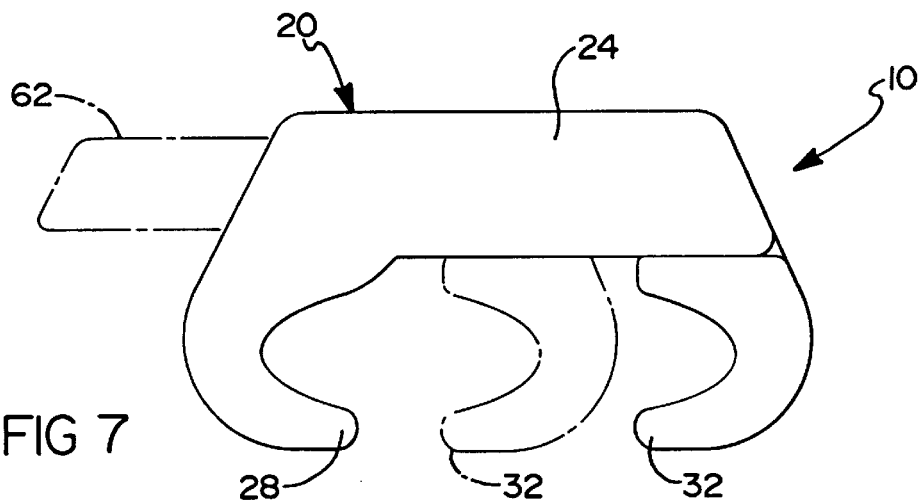

ADJUSTABLE CLAMP FOR USE WITH A VEHICLE ARTICLE CARRIER

This is a continuation of U.S. patent application Ser. No. 08/497,211, filed Jun. 30, 1995, abandoned.

BACKGROUND OF THE INVENTION

1. Technical Field

This invention relates to clamping assemblies, and more particularly to a clamping apparatus for securing an article securing implement to a cross bar of a vehicle article carrier.

2. Discussion

Vehicle article carriers are used in a wide-variety of applications to temporarily, yet securely, fasten various forms of cargo on top of an outer body vehicle surface such as a roof or deck lid of a vehicle. More recently, vehicle article carriers have been designed to support various forms of cargo such as bicycles, surf boards, wind sail boards, snow and water cargo boxes, ski boxes, skis, and various other forms of recreational equipment.

Most often, the vehicle article carrier is constructed so as to be dedicated to carrying a certain form of cargo, for example a bicycle, above an outer body surface of the vehicle such as a roof or deck lid. In many instances this requires that if a different form of cargo, for example a surf board, is to be carried, the entire vehicle article carrier or a major portion of its various components need to be replaced to handle the different form of cargo. Put differently, many forms of vehicle article carriers have not been able to carry or be easily adapted to carry a wide-variety of different forms of cargo without significant modifications which entail the inconvenience of significant disassembly of the vehicle article carrier system, and reassembly with other components suitable to carrying the new form of cargo.

It would therefore be highly desirable to provide some form of apparatus which is adapted to be used with a conventional vehicle article carrier to secure a wide-variety of article securing implements removably to the vehicle article carrier, where each one of the article securing implements is designed to be dedicated to transport a specific form of cargo such as a bicycle, surf board, etc., without requiring any disassembly and reassembly of various components of the underlying vehicle article carrier which is attached to the outer body surface of the vehicle. Such an apparatus would enable one article securing implement to be quickly removed from the vehicle article carrier and a second article securing implement to be quickly secured to the vehicle article carrier when a different form of cargo is to be transported.

Accordingly, it is a principal object of the present invention to provide an apparatus which is adapted to secure an article securing implement securely, yet removably, to an existing vehicle article carrier, and to enable the article securing implement to be quickly removed from the vehicle article carrier and a second, different article securing implement quickly attached to the vehicle article carrier when a different form of cargo is to be transported.

It is another object of the present invention to provide an apparatus for quickly, easily and removably securing an article securing implement to an existing vehicle article carrier without the need for special tools or lengthy assembly procedures.

It is still another object of the present invention to provide an apparatus which is easily removably coupled to an existing component of an existing vehicle article carrier, which interfaces with an independent article securing implement such as a bicycle carrier to removably secure the bicycle carrier to the existing component of the existing vehicle article carrier without requiring any modification to the existing vehicle article carrier or the independent article securing implement.

It is still a further object of the present invention to provide an apparatus for temporarily, removably securing an article securing implement such as a bicycle carrier to an existing vehicle article carrier, where the apparatus can be quickly removed from the existing vehicle article carrier as well as from the article securing implement and used with a second, different article securing implement if desired to secure the second article securing implement to a portion of the existing vehicle article carrier.

It is still another object of the present invention to provide an apparatus for securing an independent article securing assembly to a component of an existing vehicle article carrier, where the apparatus is relatively inexpensive to construct, of simple assembly, and is adjustable so as to be useable with support components of the existing vehicle article assembly, such as cross bars from virtually all U.S. manufactured luggage racks, which may also vary somewhat in cross-sectional width.

SUMMARY OF THE INVENTION

The above and other objects are provided by a clamp apparatus in accordance with preferred embodiments of the present invention. The apparatus generally includes a first body portion and a second body portion. The first body portion includes a channel portion and a hook portion. The second body portion includes a base portion and a hook portion. The base portion is adapted to be slidably engaged within a channel formed by the channel portion such that the hook portions can be urged towards each other once the apparatus is placed over a support bar of an existing vehicle article carrier.

In a preferred embodiment, each of the first and second body portions include an opening formed in longitudinal alignment with one another for receiving an adjustable fastener in the form of an elongated threaded fastener. A fastening nut is included which allows the first and second body portions to be clamped to a support bar. The elongated threaded fastener also provides a degree of adjustability which allows the apparatus to be used with support bars having varying cross-sectional widths.

In a preferred embodiment, the first body portion includes at least one opening for receiving a fastening element associated with the article securing implement. In one preferred embodiment, this opening comprises an elongated, slot-like opening. In the same preferred embodiment, the second body portion includes an opening formed on the base portion in longitudinal alignment with the elongated, slot-like opening such that when the base portion is at least partially slidably inserted within the channel of the first body portion, the two openings are in alignment with each other. This permits the fastening element associated with the article securing implement to be inserted through both openings and thereafter secured via, for example, a conventional threaded nut, to enable the article securing implement to be fixedly and removably secured to the clamp apparatus.

The clamp apparatus of the preferred embodiments of the present invention provides an inexpensive, yet convenient clamp for use with a variety of support bars of existing vehicle article carriers to interface with various article securing implements to secure such implements to an existing vehicle article carrier. It is a principal advantage of the present invention that use of the clamp assembly thereof does not require disassembly of any component of the existing vehicle article carrier, nor any disassembly of an article securing implement before the clamp apparatus can be utilized. The clamp apparatus of the present invention further enables a wide-variety of article securing implements to be quickly attached and removed from an existing vehicle article carrier without the need for special tools or extensive assembly and disassembly steps.

BRIEF DESCRIPTION OF THE DRAWINGS

The various advantages of the present invention will become apparent to one skilled in the art by reading the following specification and subjoined claims and by referencing the following drawings in which:

FIG. 1 is a partial perspective view of a vehicle illustrating an existing vehicle article carrier fixedly attached to an outer body surface of the vehicle, and further illustrating a pair of clamp apparatuses in accordance with a preferred embodiment of the present invention which are clampingly secured to cross bars of the vehicle article carrier, and further secured to an article securing implement in the form of a bicycle carrier;

FIG. 2 is a perspective view of the clamp apparatus of FIG. 1;

FIG. 3 is an exploded perspective view of the clamp apparatus of FIG. 2;

FIG. 4 is a bottom view of the clamp apparatus of FIG. 2;

FIG. 5 is a left end view of the clamp apparatus of FIG. 2 taken in accordance with directional arrow 5 in FIG. 2;

FIG. 6 is a right end view of the clamp apparatus of FIG. 2 taken in accordance with directional arrow 6 in FIG. 2; and FIG. 7 is a side view of the clamp apparatus of FIG. 2 showing the second body portion in two positions (one of which is in phantom) to illustrate the significant degree of adjustability of the apparatus.

DETAILED DESCRIPTION OF THE PREFERRED EMBODIMENTS

Referring to FIG. 1, there is shown a pair of clamp assemblies 10 in accordance with a preferred embodiment of the present invention. Two clamp assemblies 10 (only one being visible in FIG. 1) are secured to a front cross bar 12 of an existing vehicle article carrier 14 and another clamp apparatus 10 is secured to a rear cross bar 16 of the vehicle article carrier 14. Each of the clamp apparatuses 10 is used to securely, yet releasably, secure a specific article securing implement 18 to the cross bars 12 and 16. In the drawing of FIG. 1, the article securing implement is illustrated as a bicycle carrier adapted to support a bicycle in an upright position atop the cross bars 12 and 16. It will be appreciated, however, that the clamp apparatuses 10 are not limited to use with a bicycle carrier 18, but rather are adapted for use with a wide-variety of article securing implements such as surf board carriers, snow ski and water ski carriers, conventional box-type cargo carriers, and virtually any other form of article securing implement which could be supported atop the cross bars 12 and 16.

It is a principal advantage of the present invention that the clamp apparatuses 10 allows for a wide-variety of article securing implements to be releasably yet securely coupled to the cross bars 12 and 16 without any disassembly of the cross bars 12 and 16 or any other component of the existing vehicle article carrier 14. It is further a significant advantage of the clamp apparatuses 10 that an article securing implement can be quickly and easily removed from each clamp apparatus 10 and a second, different article securing implement quickly secured thereto without the need for special tools or extensive assembly and disassembly steps. Since the clamp apparatuses 10 are adjustable, as will be described further in the following paragraphs, each of the clamp apparatuses 10 can be slidably positioned along its respective cross bar 12 or 16 so as to distribute loads more evenly on the vehicle article carrier 14.

Referring now to FIGS. 2 and 3, the clamp apparatus 10 of the present invention is shown in enlarged perspective fashion. With specific reference to FIG. 2, the clamp apparatus 10 includes a first body portion 20 and a second body portion 22. The first body portion 20 includes a channel portion 24 forming a channel 26 and a hook portion 28. The channel portion 24 and the hook portion 28 are further integrally formed such that the first body portion 20 forms a single-piece component. The second body portion 22 includes a base portion 30 and a hook portion 32 integrally formed with the base portion such that the second body portion 22 also forms a single-piece component.

With specific reference to FIG. 3, the base portion 30 is slidably insertable within the channel 26 of the first body portion 20 such that the hook portions 28 and 32 can be adjusted relative to each other to clampingly engage opposite sides of the cross bar (12 or 16) to which it is being secured.

With further reference to FIG. 3, in a preferred embodiment the channel portion 24 further includes at least one opening in the form of an elongated, slot-like opening 34. Preferably, a second elongated, slot-like opening 36 is also formed in the channel portion 24. Each of the elongated, slot-like openings 34 and 36 are orientated to extend along the major length of the channel 26 and parallel to the direction of sliding movement of the base portion 30 when the base portion is inserted within the channel 26.

With continued reference to FIG. 3, the second body portion 22 further preferably includes at least a first opening 38 formed in the base portion 30. More preferably, a second opening 40 is also formed in the base portion 30 and laterally offset from the first opening 38. The first opening 38 is further formed so as to be aligned with the first elongated, slot-like opening 34 such that when the base portion 30 is slidably inserted into the channel 26, an external fastening element can be inserted through the slot-like opening 34 and the first opening 38, even if the base portion 30 is not completely inserted into the channel 26. Similarly, the second opening 40 is positioned to be longitudinally aligned with the second elongated, slot-like opening 36 such that a separate external fastening element can be inserted through the opening 36 and the second opening 40, when the base portion 30 is fully inserted within the channel 26.

With brief reference to FIG. 4, the base portion 30. preferably includes a pair of recesses 38a and 40a which are associated with openings 38 and 40, respectively. Within each recess 38a, 40a is a threaded nut 42 which may be permanently secured in its associated recess 38a or 40a such as by adhesives or simply by a press-fit. The threaded nuts 42 allow a threaded member of a suitable diameter of an article securing implement to be secured to the clamp apparatus 10 without the need for pliers, open-end wrenches, socket wrenches, or other like tools which would otherwise be necessary to maintain the threaded nut stationary while its corresponding threaded fastener is advanced therethrough.

With further reference to FIG. 3, the clamp apparatus 10 includes an adjustable fastening means 44 for securing the first and second body portions 20 and 22, respectively, in clamping engagement around the cross bar 12 or 16 on which it is positioned. The adjustable fastening means 44 generally comprises an elongated threaded fastener 46 and a threaded fastening nut 48 which allow the first and second body portions 20 and 22, respectively, to be gradually urged clampingly onto one of the cross bars 12 or 16. To this end, an opening 50 is formed in the second body portion 22 together with a recess 52. The recess 52 allows a head portion 54 of the elongated threaded fastener 46 to be positioned generally below an outer surface of the second body portion 22 when the clamp apparatus 10 is secured to a cross bar 12 or 16.

With brief reference to FIG. 5, the first body portion 20 includes an opening 56 for allowing a portion of the elongated threaded fastener 46 to extend therethrough. A hexagonally shaped recess 58 is also formed within which the threaded fastening nut 48 is inserted. The fastening nut 48 may be simply press-fit into the recess 58 or alternatively secured therein with adhesives such that the nut 48 is permanently secured within the recess 58. Threaded engagement between the elongated threaded fastener 46 and the fastening nut 48 prevents the portions 36 and 32 from being withdrawn apart from one another, and allows the first and second body portions 20 and 22, respectively, to be clampingly secured to one of the cross bars 12 or 16.

With further brief reference to FIGS. 5 and 7, the first body portion 20 further includes a U-shaped opening 60 which conforms to the cross-sectional shape of the base portion 30 of the second body portion 22. Thus, when the base portion 30 is inserted for almost its entire length into the channel 26, an outermost end portion 62 (FIG. 3) of the base portion 30 is able to protrude slightly through the channel portion 24 of the first body portion 20. This feature provides not only increased structural support to the clamp apparatus 10 when the apparatus is secured to one of the cross bars 12 or 16, but also enables the second body portion 22 to be slidably positioned such that the hook portion 32 is closely adjacent the hook portion 28. This close positioning of the hook portions 28 and 32 provides a wide-degree of adjustability to enable the clamp apparatus 10 to be used with cross bars having widely varying cross-sectional widths.

With further reference to FIGS. 3 and 6, an additional feature which helps to provide the significant degree of adjustability described above is a pair of grooves 64 formed on opposite sides of the recess 52. The grooves 64 allow clearance for a pair of ledges 26a and 26b (also shown in FIG. 3) which partially form the channel 26 when the base portion 30 is inserted into the channel 26 beyond a predetermined point. The grooves 64 further enhance the structural integrity of the clamp apparatus 10 by further helping to limit twisting movement of the second body portion 22 relative to the first body portion 20 when the ledges 26a, 26b engage within the grooves 64.

In operation, the threaded fastener 46 is adjusted such that the first and second body portions 20 and 22, respectively, can be urged apart from one another to a sufficient degree such that the hook portions 28,32 can clear opposing widthwise edges of one of the cross bars 12 or 16 when the clamp apparatus 10 is positioned over one or the other of the cross bars 12 or 16. Once positioned on one of the cross bars 12 or 16, the elongated threaded fastener 46 is advanced until the hook portions 28 and 32 are clampingly engaged over the cross bar 12 or 16. Either one or a pair of conventional threaded fastening elements such as threaded screws associated with the article securing implement 18 can then be inserted through the elongated slot-like openings 34 and/or 36, and openings 38 and/or 40, such that the threaded fastening elements threadably engage the threaded nuts 42 (FIG. 4), thus allowing the article securing implement 18 to be fixedly yet releasably secured to the clamp apparatus 10. When a different article securing implement is to be attached to the vehicle article carrier 14 (FIG. 1), the threaded fastening elements securing the existing implement to the clamp apparatus 10 are removed and the existing implement may then be removed and a new article securing implement secured via the threaded fastening elements to the threaded nuts 42. Since the elongated threaded fastener 46 is positioned in a plane above the outer surface of the cross bar 12 or 16 to which it is attached, there is no interference with the cross bar 12 or 16 as the fastener 46 is adjusted. Similarly, since each of the nuts 42 are positioned so as to be laterally offset from the threaded fastener 46, the engagement of two external threaded fasteners (i.e., bolts) with the nuts 42 does not interfere with the threaded fastener 46 or any other portion of the clamp apparatus 10 or the cross bar 12 or 16.

The ease with which the clamp apparatus 10 may be clampingly engaged and disengaged to the cross bars 12 and 16 enables the clamp apparatus 10 to be quickly and easily slidably repositioned along one or the other of the cross bars 12 or 16 such that the load supported by the article securing implement can be balanced properly on the existing vehicle article carrier 14. It will be appreciated that the diameter and thread pitch of the fastening elements of the article securing implement will need to match the size and thread pitch of the nuts 42. It should be understood that most, if not all, article securing implements are provided with threaded fastening screws that are removable from their associated support/mounting structure. Thus, even if a certain article securing implement is equipped with threaded screws of the wrong diameter or thread pitch to engage the nuts 42, suitable threaded bolts can almost always be substituted to enable the article securing implement to be secured to the nuts 42 of the clamp apparatus 10.

The clamp apparatus 10 is preferably injection molded from a suitably high-strength plastic such as nylon or any other plastic which has good strength and structural rigidity. obviously, the apparatus 10 can be formed from other materials and through other conventional manufacturing techniques if desired. The clamp apparatus 10 forms a relatively inexpensive, lightweight, yet strong and simply constructed clamp apparatus which allows a wide-variety of article securing implements to be attached to an existing vehicle article carrier quickly and easily and without requiring disassembly or reassembly of any component of the existing vehicle article carrier.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An independent adjustable clamp apparatus for use with a support member of an existing vehicle article carrier for securing an external article securing implement to said support member of said vehicle article carrier without disassembly of any portion of the article carrier, said apparatus comprising:

a first body portion and a second body portion;

said first body portion including a channel portion forming a channel, and a hook portion, said channel portion including at least one elongated slot opening into said channel for receiving a fastening element adapted to secure said article restraining implement to said apparatus, a pair of ledges facing one another to partially form said channel portion, and a first opening in communication with said channel;

said second body portion including a base portion, a hook portion and a pair of grooves, with said base portion being operable to slidably engage within said channel portion and to be held within said channel portion by said ledges such that a spacing of said hook portions of said first and second body portions can be adjusted to clampingly engage said support member of said vehicle article carrier;

said base portion of said second body portion including a second opening in longitudinal alignment with said first opening and a third opening extending generally transversely to said channel and in longitudinal alignment with said elongated slot so as to register with said elongated slot when said base portion of said second body portion is at least partially inserted in said channel portion of said first body portion;

a first fastener having a length sufficient to extend through said first and second openings when said first body portion is engaged with said second body portion for securing said first body portion to said second body portion at a desired spacing such that said first and second body portions can be maintained in secure clamping engagement around said support member of said vehicle article carrier;

wherein said third opening and said elongated slot overlap one another when said first and second body portions are engaged with one another to permit a second fastener to be inserted through said third opening and said elongated slot to enable said external article securing implement to be secured to said apparatus while permitting a degree of adjustable spacing between said hook portions and without interfering with said first fastener; and wherein said grooves accept a portion of each one of said ledges when said base portion of said second body portion is slidably engaged to permit said first and second body portions to be drawn closely adjacent each other.

2. The apparatus of claim 1, wherein said third opening and said at least one elongated slot are laterally offset from said first and second openings such that said second fastener does not interfere with said first fastener when said first and second body portions are engaged with one another, and to permit adjustable spacing of said first and second body portions relative to each other without interference between said first and second fasteners.

3. A vehicle article carrier apparatus for supporting articles above an outer body surface of a vehicle, said apparatus comprising:

a pair of elongated slats adapted to be secured to said outer body surface;

a cross bar adapted to be secured to said slats so as to extend transversely between said slats;

an independent adjustable clamp for securing an external article securing implement to said cross bar without disassembly of said cross bar from said slats;

said clamp including:
a first body portion and a second body portion;
said first body portion including a channel portion forming a channel, and a hook portion, said channel portion including at least one elongated slot opening into said channel for receiving a fastening element adapted to secure said article restraining implement to said cross bar, a pair of ledges facing one another to partially form said channel portion, and a first opening in communication with said channel;

said second body portion including a base portion, a hook portion with said base portion being operable to slidably engage within said channel portion and to be held within said channel portion by said ledges such that a spacing of said hook portions of said first and second body portions can be adjusted to clampingly engage said cross bar;

said base portion of said second body portion including a second opening in longitudinal alignment with said first opening and a third opening extending generally transversely to said channel and in longitudinal alignment with said elongated slot so as to register with said elongated slot when said base portion of said second body portion is at least partially inserted in said channel portion of said first body portion;

a first fastener having a length sufficient to extend through said first and second openings when said first body portion is engaged with said second body portion for securing said first body portion to said second body portion at a desired spacing such that said first and second body portions can be maintained in secure clamping engagement around said cross bar; and wherein said third opening and said elongated slot overlap one another when said first and second body portions are engaged with one another to permit a second fastener to be inserted through said third opening and said elongated slot to enable said external article securing implement to be secured to said apparatus while permitting a degree of adjustable spacing between said hook portions and without interfering with said first fastener.

4. The vehicle article carrier of claim 3, further comprising:

a pair of grooves formed in said second body portion of dimensions to accept portions of said ledges of said first body portion; and wherein said grooves accept a portion of each one of said ledges when said base portion of said second body portion is slidably engaged to permit said first and second body portions to be drawn closely adjacent each other to clampingly engage said cross bar.

5. A vehicle article carrier apparatus for supporting articles above an outer body surface of a vehicle, the apparatus comprising:

a pair of slats adapted to be secured to said outer body surface generally parallel to one another;

a cross bar securable to said slats for supporting thereon an article carrying implement;

a clamp for securing said article securing implement to said cross bar, said clamp including:
a first body portion;
a second body portion;
said first body portion including a channel portion and a hook portion, said channel portion including a first opening for accepting a clamp fastening member and at least one second opening for accepting an article securing fastener;

said second body portion including a base portion and a hook portion, said base portion including a first opening for accepting said clamp fastening member, and wherein said second body portion is operable to slidably engage said channel portion when said first and second body portions are placed on said cross bar;

a clamp fastening member for urging said first and second body portions toward each other and maintaining said first and second body portions clamped to said cross bar.

6. The apparatus of claim 5, further comprising:

a second opening formed in said base portion of said second body portion such that when said base portion is slidably engaged within said channel portion said external fastening element can extend through said both of said second openings.

7. The apparatus of claim 6, further comprising:

at least one groove formed in said second body portion; and at least one ledge portion extending from said channel portion;

said groove being operable to accept at least a portion of said ledge portion when said base portion is slidably inserted into said channel portion.

\* \* \* \* \*